March 30, 1937.    H. W. BULL    2,075,424
SPEEDOMETER FOR BICYCLES
Filed April 18, 1935
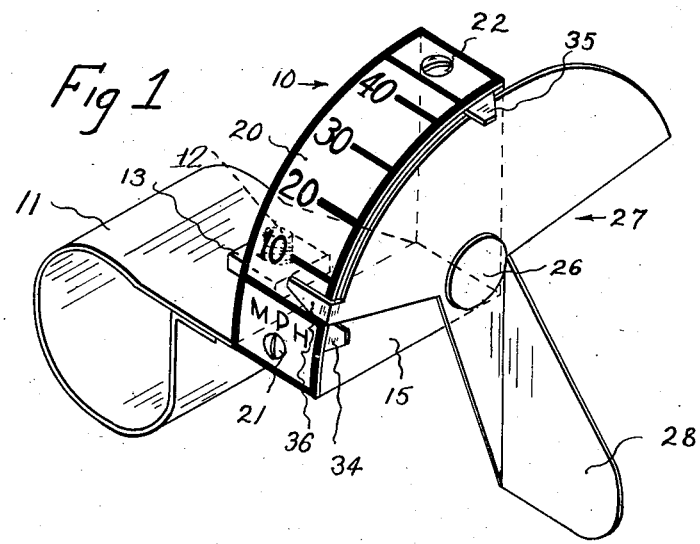
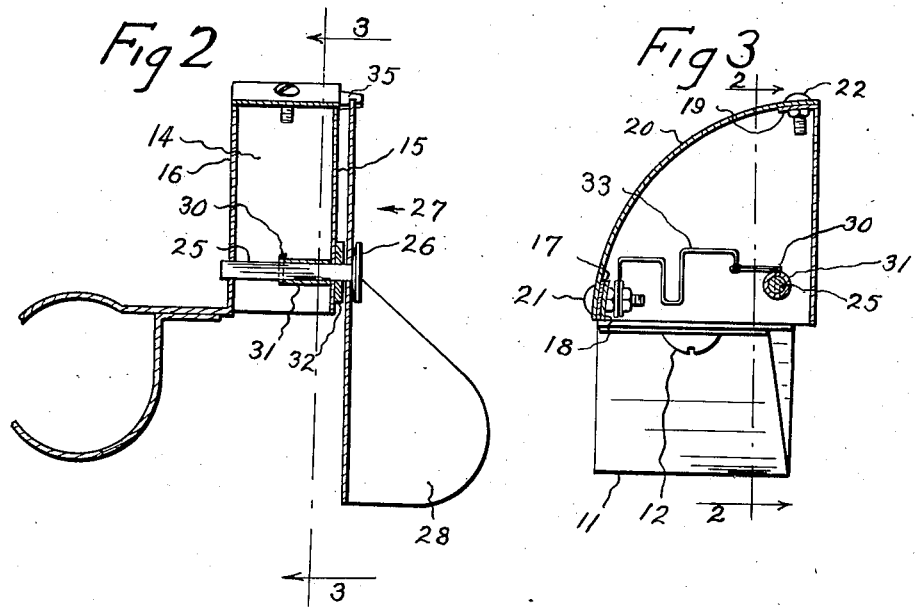
INVENTOR
HARRY W. BULL
BY Chapin & Neal
ATTORNEYS Patented Mar. 30, 1937

2,075,424

UNITED STATES PATENT OFFICE 2,075,424

SPEEDOMETER FOR BICYCLES

Harry W. Bull, Syracuse, N. Y.

Application April 18, 1935, Serial No. 17,079

2 Claims. (Cl. 265—23)

This invention relates to speedometers particularly adapted for use on bicycles. One purpose of the invention is to provide a construction of a speedometer which will enable the speed of a bicycle to be gauged with sufficient accuracy for this type of use while presenting a structure sufficiently simple mechanically to enable it to be manufactured and sold at a price low enough to permit the average bicycle user to buy it. The use of a speedometer on a bicycle is largely confined to boys who cannot afford to pay the cost of an instrument of scientific accuracy, and who desire the device more for amusement and for information as to relative speeds than for accurate knowledge of the speed at which the bicycle is moving. Speedometers of the type driven from one of the wheels of the bicycle require a complication of mechanical devices which render their use too expensive to be generally practicable for this type of purchaser; and it is the object of the present invention to make a speedometer operating upon a different principle which can be sold at a price within the capacity of the average user of a bicycle. Another object of the invention is to provide a speedometer of this general type which will be largely independent of inertial effects due to sudden changes in speed such as would result from striking bumps or obstacles in the road. A further object is to provide a speedometer of this general type which can be applied to a bicycle by the average user without the necessity for special knowledge or special tools. A further object is to provide a speedometer of this general character which may be applied to a bicycle without requiring connections to rotative parts thereof. Other and further objects of the invention will appear from the following description and claims.

Referring to the drawing—

Fig. 1 is a perspective view of the device;

Fig. 2 is a front view thereof taken in section on line 2—2 of Fig. 3; and

Fig. 3 is a section on line 3—3 of Fig. 2.

The device may be embodied in many different forms, but since one of the main purposes of the invention is to provide a simple structure which can be applied as an integrated and complete entity to the handlebar of a bicycle; and as a further object is to provide a device having the fewest possible parts; the invention will be described in its preferred embodiment in which the parts are largely constructed of sheet metal. In this embodiment the device is built around a support 10 folded out of a single sheet of metal. One portion of the support is bent around as at 11 to provide means for attachment to the handlebar of a bicycle, the loop thus formed being adapted to be tightened by a screw 12 and a nut 13. The main part of the support is a box-like structure having a back wall 14, side portions 15 and 16, and a front wall which may be made solid if desired but which is preferably composed of overlapping members 17 and 18 and a top member 19. To these members 17 and 18 on the one hand and the member 19 on the other is secured a scale 20 as by screws 21 and 22 respectively, the screws being provided with the usual nuts. By this arrangement of the support the scale 20 is positioned with its axis transverse to the direction of movement of the bicycle. If it were desired to form the front of the box-like structure integral with the member 19, for example, the scale could be painted or printed directly on this front wall.

Through opposed holes in the side walls 15 and 16 passes a pivot 25, preferably having a head 26 at its outer end and secured against endwise movement as will be described. Upon this pivot, externally of the box-like structure, is mounted a vane member 27 secured to the pivot by soldering or merely by making it a force fit thereon. The lower portion of the vane member is turned outwardly as at 28 in a direction to be exposed to the air through which the bicycle moves and consequently to be deflected thereby. The upper portion of the vane member is in the case shown made segmental in shape so as to act as a counterweight and eliminate any tendency which might be imparted to the vane to rotate under the influence of accelerating forces which might be imposed on the bicycle. These forces might be in a horizontal direction due to sudden changes in speed, or might be in a vertical direction in consequence of irregularities in the road surface over which the bicycle is traveling. The effect of these forces in causing undesired fluctuations in the reading of the speedometer is largely removed by the counterbalancing action described.

Within the box-like structure the pivot is provided with a pin 30 between which and the wall of the structure adjacent the vane is positioned a spacing sleeve 31, conveniently made by simply bending a piece of sheet metal around the pivot. This acts to prevent endwise movement of the pivot in one direction, movement in the other being prevented by the vane itself and an interposed washed 32. A generally U-shaped spring 33 is connected to the pin 30 at one end and to the screw 21 at the other so that the legs of the U are pulled apart as the pivot is rotated in a clockwise direction as viewed in Fig. 3. The spring may be of the usual helical type, but is preferably of the bent form shown, as it has been found that this form is not only cheaper to make but can more readily be shaped and adjusted to give the desired proportionality between the force of the air on the vane and the rotative position which the vane assumes under that pressure. The support 10 is also preferably formed with lugs 34 and 35 which fix the zero position and the maximum position of the vane respectively, these lugs cooperating with a pointer 36 formed integral with the counterbalancing portion of the vane and overlying the scale 20.

The manner of use of the device will be largely obvious from the description above. In the first place it will be observed that all the parts of the device are carried directly upon the support 10, so that it is unnecessary for the purchaser to make any complicated connections to rotating parts of the bicycle or to do anything other than to secure the support to the handlebar by means of the single screw and nut connection 12, 13. The force of the air pressure on the vane portion 28 is proportional to the speed at which the bicycle is moving, and under ordinary conditions the velocity of the wind as close to the ground as the device is used will not be sufficient to disturb the accuracy of the device seriously. In any case, as pointed out originally, the main purpose of the device is to provide a device which can be applied to a bicycle at a price which can be met by the usual bicycle owner, and not to provide an instrument of high precision.

I claim:

1. A speedometer for vehicles such as bicycles which comprises an arcuate scale, means for mounting the scale on a bicycle with the axis of the scale transverse to the direction of movement of the bicycle, a movable member pivoted coaxially with the scale, said movable member being provided with a segmental portion having a pointer portion movable over the scale as the movable member turns on its pivot, and with a vane portion bent at right angles to the segmental portion and adapted to receive the pressure of the air as the bicycle moves, and a spring mounted to resist the turning of the movable member.

2. A speedometer for vehicles such as bicycles which comprises an arcuate cylindrical scale, a support for said scale including a band for encircling the handlebar of the bicycle in position to hold the scale with its axis transverse to the direction of the movement of the bicycle, a movable member pivoted coaxially with the scale, said movable member being provided with a segmental portion operable as a counterweight and having a pointer portion movable over the scale as the movable member turns on its pivot, and with a vane portion bent at right angles to the segmental portion and adapted to receive the pressure of the air as the bicycle moves, and a generally U-shaped spring connected to the movable member in such a manner that the legs of the U are pulled apart as the member is rotated by the pressure of the air.

HARRY W. BULL.